United States Patent
Fischer et al.

(10) Patent No.: US 6,438,672 B1
(45) Date of Patent: Aug. 20, 2002

(54) MEMORY ALIASING METHOD AND APPARATUS

(75) Inventors: Frederick Harrison Fischer, Macungle; Vladimir Sindalovsky, Perkasie; Scott A. Segan, South Whitehall Township, Lehigh County, all of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/327,157

(22) Filed: Jun. 3, 1999

(51) Int. Cl.7 .............................................. G06F 12/00
(52) U.S. Cl. ...................... 711/210; 711/202; 711/216; 711/221; 712/217
(58) Field of Search ................................ 711/210, 202, 711/216, 221; 712/217

(56) References Cited

U.S. PATENT DOCUMENTS

| | | | |
|---|---|---|---|
| 4,380,066 A | 4/1983 | Spencer et al. | |
| 4,739,498 A | 4/1988 | Eichhorn | |
| 5,058,059 A | 10/1991 | Matsuo et al. | |
| 5,058,070 A | 10/1991 | Faber et al. | |
| 5,119,290 A | * 6/1992 | Loo et al. | 711/210 |
| 5,153,880 A | 10/1992 | Owen et al. | |
| 5,204,836 A | 4/1993 | Reed | |
| 5,224,073 A | 6/1993 | Nakayama | |
| 5,255,234 A | 10/1993 | Seok | |
| 5,257,228 A | 10/1993 | Sukegawa | |
| 5,313,424 A | 5/1994 | Adams et al. | |
| 5,383,156 A | 1/1995 | Komatsu | |
| 5,390,149 A | 2/1995 | Vogley et al. | |
| 5,392,246 A | 2/1995 | Akiyama et al. | |
| 5,396,124 A | 3/1995 | Sawada et al. | |
| 5,416,740 A | 5/1995 | Fujita et al. | |
| 5,420,824 A | 5/1995 | Kajimoto et al. | |
| 5,469,390 A | 11/1995 | Sasaki et al. | |
| 5,485,425 A | 1/1996 | Iwai et al. | |
| 5,513,144 A | 4/1996 | O'Toole | |
| 5,548,555 A | 8/1996 | Lee et al. | |
| 5,644,699 A | 7/1997 | Yoshida | |
| 5,675,543 A | 10/1997 | Rieger | |
| 5,696,723 A | 12/1997 | Tukahara | |
| 5,860,138 A | * 1/1999 | Engebretsen et al. | 711/202 |
| 5,877,986 A | 3/1999 | Harari et al. | |
| 5,890,221 A | * 3/1999 | Liu et al. | 711/210 |
| 6,006,312 A | * 12/1999 | Kohn et al. | 711/210 |
| 6,011,733 A | 1/2000 | Fischer et al. | |

* cited by examiner

*Primary Examiner*—Matthew Kim
*Assistant Examiner*—Matthew D. Anderson
(74) *Attorney, Agent, or Firm*—William H. Bollman

(57) ABSTRACT

A flexible memory overlaying apparatus and method stores repeatedly referenced information, e.g, common global variables, common code segments, interrupt service routines, and/or any other user or system definable information, in spare addressable circuits accessed by a memory aliasing or overlaying module. The memory aliasing module monitors (or snoops) memory access by a processor to redirect access to certain appropriate addressable circuits to provide faster access to the information than would be available in an access made from main memory. The memory overlaying apparatus and method provides an efficient context switching, e.g., during an interrupt, enables a reduction in the size of instruction code requirements, and helps avoid the occurrences of cache misses, and/or thrashing between cached pages.

24 Claims, 6 Drawing Sheets

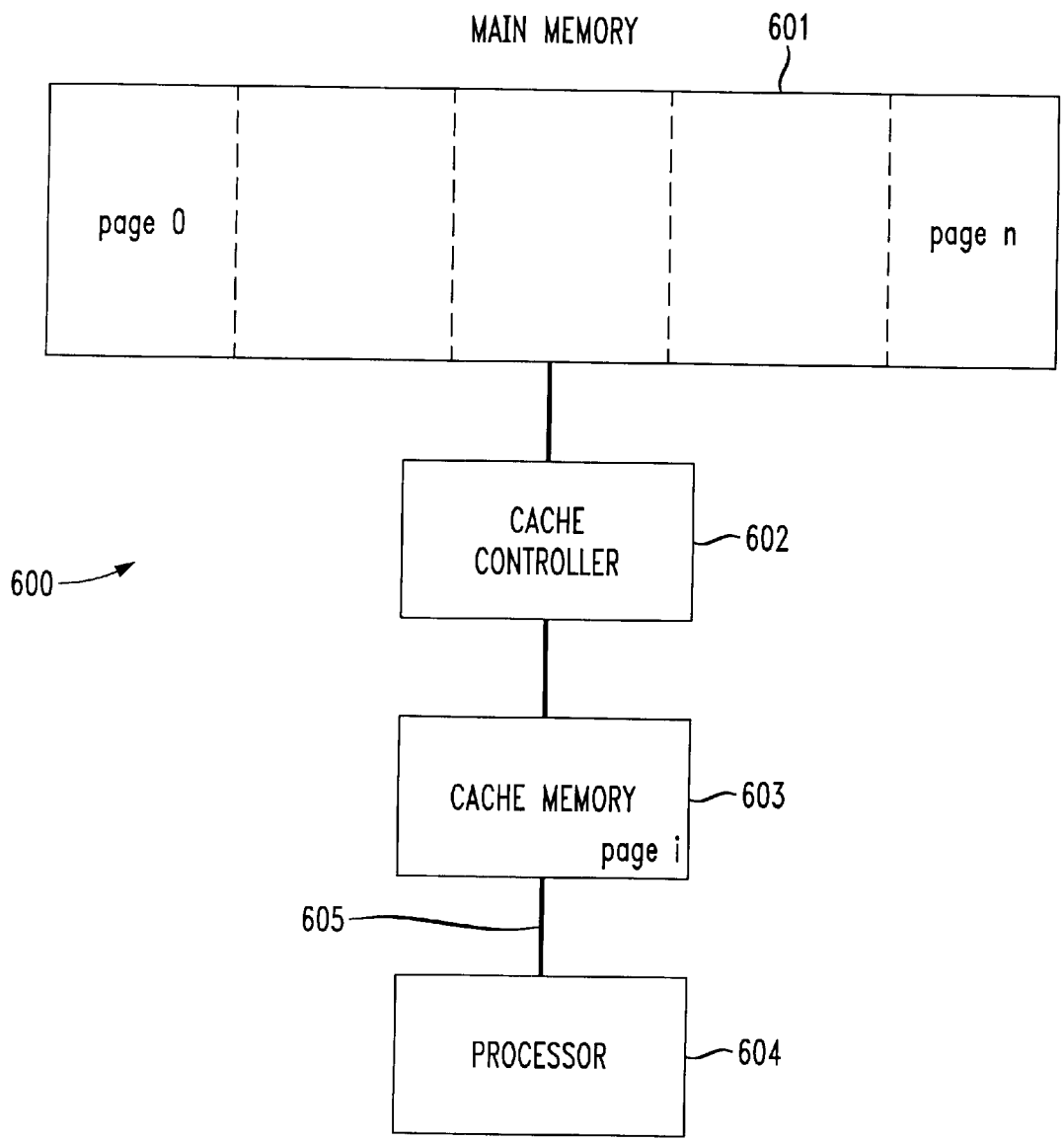

MEMORY ALIASING METHOD AND APPARATUS

BACKGROUND OF THE INVENTION

1. Field of the Invention

This invention relates to a addressable memory interface. More particularly, it relates to a method and apparatus to adaptively overlay a group of memory addresses to provide an efficient and flexible processor/memory interface.

2. Background of Related Art

Processors nowadays are more powerful and faster than ever. So much so that even memory access time, typically in tens of nanoseconds, is seen as an impediment to a processor running at its full speed. Typical CPU time of a processor is the sum of the clock cycles executing instructions and the clock cycles used for memory access. While modern day processors have improved greatly in the Instruction execution time, access times of reasonably priced memory devices have not similarly improved.

Thus, rather than relying on improvements in access speed of memory devices themselves, improved memory accessing methods and processor/memory interface architectures are employed in modern computer systems to minimize the above described bottleneck effect of memory access time.

For example, some processor/memory architectures take advantage of a memory-interleaving scheme in which consecutive data segments are stored across a number of banks of memory to allow parallel access to multiple memory locations and a large segment of data. Another particularly common memory access time enhancing method is memory caching. Caching takes advantage of the antithetical nature of the capacity and speed of a memory device. That is, a bigger (or larger storage capacity) memory is generally slower than a small memory. Also, slower memories are less costly, thus are more suitable for use as a portion of mass storage than are more expensive, smaller and faster memories.

In a caching system, memory is arranged in a hierarchical order of different speeds, sizes and costs. For example, as shown in FIG. 6, a smaller and faster memory, usually referred to as a cache memory 603 is placed between a processor 604 and larger, slower main memory 601. Typically, a hierarchical division is made even within a cache memory, so that there ends up being two levels of cache memories in the system. In this layered cache system, the smaller and faster of the two levels of cache memories, typically called level one or L1, may be a small amount of memory embedded in the processor 604. The second level or L2 cache is typically a larger amount of memory external to the processor 604.

The cache memory may hold a small subset of data stored in the main memory. The processor needs only a certain a small amount of the data in the main memory to execute individual instructions for a particular application. The subset of memory is chosen based on an immediate relevance, e.g., likely to be used in near future. This is much like borrowing only a few books at a time from a large collection of books in a library to carry out a large research project. Just as research may be just as effective and even more efficient if only a few books at a time were borrowed, processing of an application program is efficient if a small portion of the data was selected and stored in the cache memory at any one time.

A cache controller 602 monitors (i.e., "snoops") the address lines of the bus 605 to the processor 604, and whenever a memory access is made by the processor 604, compares the address being accessed by the processor 604 with addresses of the small amount of data that is stored in the cache memory 603. If data needed by the processor 604 is found in the cache memory 603, a "cache hit" is said to have occurred, and the processor 604 is provided the required data from the faster cache memory 603, analogous to finding the necessary information in the small number of books that were borrowed. If the information needed by the processor 604 is not stored in the cache memory 603, a "cache miss" is said to have occurred, and an access to the slower main memory 601 must be made, analogous to making another trip to the library. As can be expected, a cache miss in the L2 cache memory, which requires access to slower main memory 601, is more detrimental than a cache miss in the L1 cache memory, which only requires aa subsequent access to slightly slower L2 cache memory.

Obviously, the goal is to increase cache hits (or to reduce cache misses). Typically, this goal is achieved by following what is called the "locality" theory. According to this theory, a temporal locality is based on the general axiom that if a particular piece of information was used, the same information is likely to be used again. Thus, data that was once accessed by the processor 604 is brought into the cache 603 to provide faster access during probable subsequent reference by the processor 604. According to a second locality theory known as the spatial locality theory, when information is accessed by the processor 604, information whose addresses are nearby the accessed information tend to be accessed as well. Thus, rather than storing only the once accessed data into the cache, a block of data, e.g. a page i, in the vicinity including the once accessed data is brought into the cache memory.

With every memory access by the processor 604, these locality theories are used to decide which new page or pages of data are to be stored in the cache memory 603. The new page replaces an existing page of data in cache 603 using a block (or page) replacement strategy, e.g., FIFO, random, or least recently used (LRU) methods, well known to designers and architects of computer systems.

While the use of cache memory in a memory/processor interface described above has provided a significant improvement in avoiding memory access time bottlenecks, and in preventing slow down of a processor otherwise capable of running at higher speed, the caching system described above suffers from significant drawbacks.

For example, cache thrashing occurs when a frequently used block of data is replaced by another frequently used block, thus causing a repeated fetching and displacement of the same block of data to and from the cache memory 603. The thrashing may occur when the processor 604 is processing a set of instructions that has too many variables (and/or is simply too large) to fit into the cache memory. In this case, for example, when one particular variable is referenced by the processor 604 and is not present in the cache memory 603, a cache miss would occur. If so, the variable must be retrieved from the main memory 601 and stored in the cache memory 603 for access by the processor 604. However, because the cache memory 603 may already be full due to the storage of the large code segment, another variable must be removed to make room for the variable currently being referenced. Then when the processor 604 subsequently references the variable that was removed from the cache memory 603, the above cache miss process is repeated. Thus, in this scenario, it is likely that blocks of data may be constantly fetched and replaced whenever the processor 604 references a particular variable.

The user may be aware of a particular set of information, e.g., common global variables, or set of common program codes, which are frequently referenced by the processor or are referenced by various components or applications in a particular computer system. Unfortunately, conventional processor/memory interface architectures are fixedly defined by a system designer, thus a user cannot remedy the above described problem even if the user is aware of a set of information that is expected to be frequently referenced by the processor.

The size of a large set of instructions (or programs) can be reduced significantly by use of common code segments that are shared with other sets of instructions. The program may include only a reference, e.g., jump or call instructions, to the common code segment that is stored separate from the program, thus is reduced in size. The reduced sized program may then fit in the available cache memory space, thus avoiding the above described thrashing of cache memory. Aside from avoiding thrashing, smaller code size generally provides faster execution speed. Thus, a reduction in size (i.e., code compression) in and of itself, even if still too large for the cache memory, increases speed, and thus is generally desirable.

Unfortunately, faster speed cannot be easily realized in conventional processor/memory architectures because when the reduced sized program is referenced by the processor of the conventional system, portions of the program which may reference the common code segment are loaded into the cache. Unfortunately, conventional architecture schemes do not account for the storage of the common code segment in faster memory, e.g., the cache memory. When reference is made to the common code segment during execution of the size reduced program, the segment must be brought from the slower main memory, incurring a cache miss. Thus, even though the user may be aware of the speed advantages of providing common code segments in faster memory, conventional processor/memory architectures do not allow them to fully realize the benefit of the size reduction of programs.

Furthermore, conventional processor/memory interfaces do not provide efficient context switching, e.g., when an interrupt is triggered. For instance, when an interrupt is requested, the operating system of the computer system preserves the state of the processor 604 by storing the current contents of the registers and the program counter of the processor 604, and allows the processor 604 to run a routine to service the particular interrupt that had occurred. Typically, the interrupt service routine (ISR) is fetched from the main memory 601 or from another memory storage area, i.e., ROM or the BIOS memory.

However, because the service routine was not found in the cache memory when the processor 604 attempted to execute the ISR, a cache miss will occur. Another cache miss (or even an error due to in ability to return to the same data set) may occur when the processor 604 tries to access the page after the completion of the interrupt service routine. This is because the routine may replace the current page in the cache memory (the page that was being accessed by the processor 604 just prior to the occurrence of the interrupt).

Furthermore, in a multi-tasking environment, e.g., when multiple copies of an application are running simultaneously, each running copy of the application has its own global variable space, each storing global variables which may be common between the two running applications. Such redundant storage of common global variables is wasteful of memory, and causes the size of the application program to become unnecessarily large, and makes it more likely that cache thrashing will be caused.

There is a need for more efficient processor/memory architecture to provide a guard against cache misses, page replacement and/or thrashing during an access to a globally used routine or variable, or during context switching, e.g., during an invocation of an interrupt service routine.

There is also a need for more efficient and faster processor/memory architecture to allow code size reduction and/or memory space savings.

SUMMARY OF THE INVENTION

In accordance with the principles of the present invention, a memory aliasing (or overlay) apparatus comprises at least one spare addressable circuit having repeatedly referenced information persistently stored therein, and an overlay control module intercepting a data path between a processor and a plurality of addressable circuits. The overlay control module is adapted to redirect access to said repeatedly referenced information by said processor from said at least one of said plurality of addressable circuits to the at least one spare addressable circuit.

In accordance with the principles of the present invention, a method of providing overlay of at least one location in a plurality of addressable circuits for access by a processor comprises, providing at least one spare addressable circuit; persistently storing repeatedly referenced information in at least one spare addressable circuit, intercepting a data path between the processor and the plurality of addressable circuits; and redirecting access to the repeatedly referenced information from at least one location of the plurality of addressable circuits by said processor to at least one spare addressable circuit.

BRIEF DESCRIPTION OF THE DRAWINGS

Features and advantages of the present invention will become apparent to those skilled in the art from the following description with reference to the drawings, in which:

FIG. 6 is a block diagram of a conventional processor/memory interface including a cache memory.

DETAILED DESCRIPTION OF ILLUSTRATIVE EMBODIMENTS

The present invention provides a flexible and efficient memory overlaying device usable with existing processor/memory architectures. A memory overlaying device in accordance with the principles of the present invention overlays user definable memory locations to reduce overall memory requirements. A memory overlaying device in accordance with the principles of the present invention is particularly useful for overlaying common global variables, common code segments and/or for user defined data.

While the present invention is described with respect to preferred embodiments in which an adaptive addressable circuit redundancy module is provided as an example of a memory aliasing module of the present invention, the present invention is equally applicable to any such device capable of overlaying memory locations for monitoring/snooping memory access by a processor.

The present invention provides an adaptive, flexible and efficient memory address overlaying method and apparatus for use in a processor/memory interface architecture using a memory address snoop/compare circuit. Such a device that may be utilized in the method and/or as the apparatus is described in U.S. Pat. Application Ser. N0. 08/030,870, entitled ADAPTIVE ADDRESABLE CIRCUIT REDUNDANCY METHOD AND APPARATUS, filed Feb. 26, 1998, by the same inventors and assigned to the same assignee of this application, the entirety of which is explicitly incorporated herein by reference.

Figure 1:
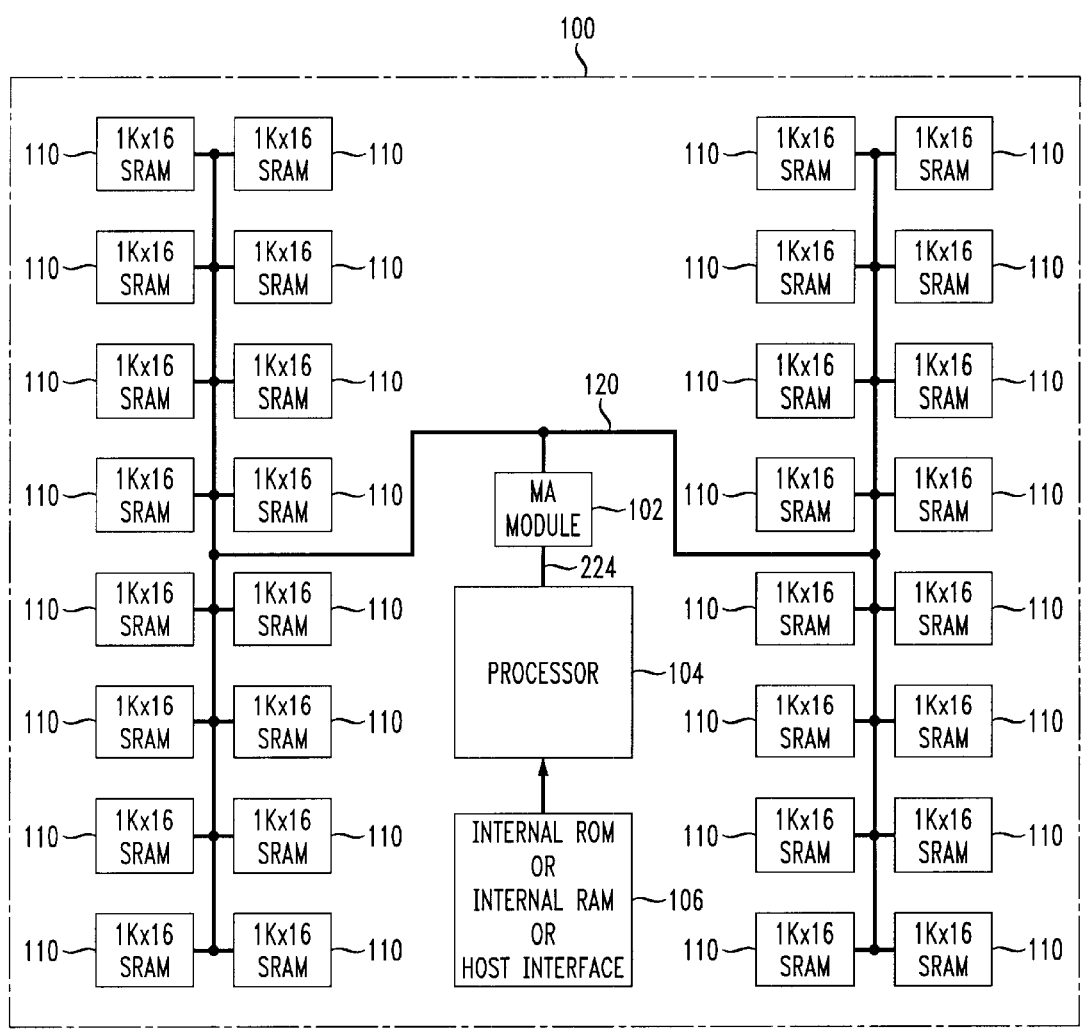
FIG. 1 is a block diagram of relevant portions of a processor/memory interface including a memory aliasing overlay module, in accordance with the principles of the present invention.

FIG. 1 shows a block diagram of relevant portions of a computer system 100 including a memory aliasing module 102 in accordance with the principles of the present invention.

In particular, the computer system 100 includes a processor 104, a plurality of memory blocks 110 which together may comprise a larger memory, e.g., a main memory for the computer system 100, a memory aliasing module 102, and an implementation module 106. Any number of components shown in FIG. 1 may be fabricated in a single integrated circuit, e.g., as a single chip computer. Alternatively, the computer system 100 may be implemented by assembling components that are physically separate.

In the disclosed embodiments, the processor 104 may be a digital signal processor (DSP), e.g., Model DSP 1600 commercially available from LUCENT TECHNOLOGIES INC. The processor 104, while being a DSP in the disclosed embodiments, may alternately be any suitable processing element such as a microprocessor, microcontroller, or a DSP.

The memory blocks 110 in the disclosed embodiment are configured, e.g., as 32 blocks of 1K×16 bit static random access memory (SRAM). Each word in the embedded memory blocks 110 is 16-bits in length, although the present invention is equally applicable to any appropriate word length memory configuration. Other memory types (e.g., read only memory (ROM), flash memory, dynamic random access memory (DRAM), magnetic, and/or optical storage elements, etc.), other memory configurations, other memory lengths, and/or other memory word lengths other than those shown with respect to the disclosed embodiment may be implemented within the principles of the present invention.

The memory blocks 110 are dedicated to the processor 104 in the disclosed embodiment, although other processors (not shown) can be implemented on the same system utilizing the same or separate memory blocks 110. The processor 104 communicates with the memory blocks 110 over suitable address, data and control busses, collectively referred to herein as memory interface 120.

The processor 104 and memory aliasing module 102 interface to the applicable addressable circuits, e.g., memory blocks 110 through a memory interface 120, which includes an address bus, a data bus, and a control bus. Although not shown in FIG. 1, one or more levels of cache memories may be present between the memory aliasing module 102 and the main memory, e.g., the collection of the memory blocks 110.

The memory aliasing module 102 is capable of detecting defective addressable circuit elements, e.g., any of memory blocks 110, and substituting therefor spare addressable circuit elements, and thus provide addressable circuit redundancy as described in detail in the above identified co-pending sister application.

In addition, according to the principles of the present invention, the memory aliasing module 102 contains circuitry necessary to implement overlaying of any locations of the memory blocks 110, or any other addressable storage area in the computer system 100. The overlaid storage area locations may or may not be contiguous. For instance, the memory aliasing module 102 contains the snoop and overlay control circuitry used to redirect access to particular addresses of addressable circuits, e.g., a particular block of the memory blocks 110, by the processor 104, with spare addressable circuits, e.g., spare memory words.

The memory aliasing module 102 functions in cooperation with software operating the processor 104 which tests the memory blocks 110, analyzes the test results, and assigns and enables spare memory words to adaptively implement addressable circuit redundancy as described in the above identified co-pending sister application.

In addition, according to the principles of the present invention, The memory aliasing module 102 functions in cooperation with software operating the processor 104 to store the addresses and contents of particular blocks of addressable circuits (e.g., a particular block of the memory block 110) in the memory aliasing module 102 to redirect access to the particular addresses of the addressable circuits by the processor 104 to the corresponding spare addressable circuits of the memory aliasing (i.e., memory overlay) module 102.

The implementation module 106 stores, facilitates and/or downloads the operating system (OS) and/or the memory overlay software for use by the processor 104. In the disclosed embodiment, the implementation module 106 may include ROM, RAM, and/or a serial or parallel interface for accepting downloaded software routines for storage in the implementation module 106 or other memory area in the computer system 100.

According to the inventive method and apparatus, the software supplied through the implementation module 106 programs the processor 104 to load the addresses and contents of one or more user definable blocks of the memory blocks 110, or of any other storage area within the computer system 100. For example, the processor 104 may be programmed by software stored in a ROM or a RAM within the implementation module 106 upon power up or after a hard reset, and/or by a host computer system through a serial or parallel host interface during operation. The processor 104 may be programmed to enable and/or disable memory aliasing dynamically. For instance, the processor 104 may be programmed to normally disable memory aliasing, i.e., the memory aliasing module 102 becomes transparent. The processor would then enable memory aliasing when a predetermined event occurs, e.g., an interrupt.

Any repeatedly referenced information, e.g., system level variables, common global variables, common code segments, interrupt service routines, etc., or any other user defined information may be overlaid by the methods and apparatus according to the principles of the present invention.

The decision of which blocks to overlay (i.e., to load into the memory aliasing module) may be fixedly made by, e.g., the BIOS or the operating system (OS). Moreover, the overlay can be made reconfigurable by prompting the user at power up or at hard reset, e.g., by the BIOS or the OS, or from communication by the user through a host interface.

Figure 2:
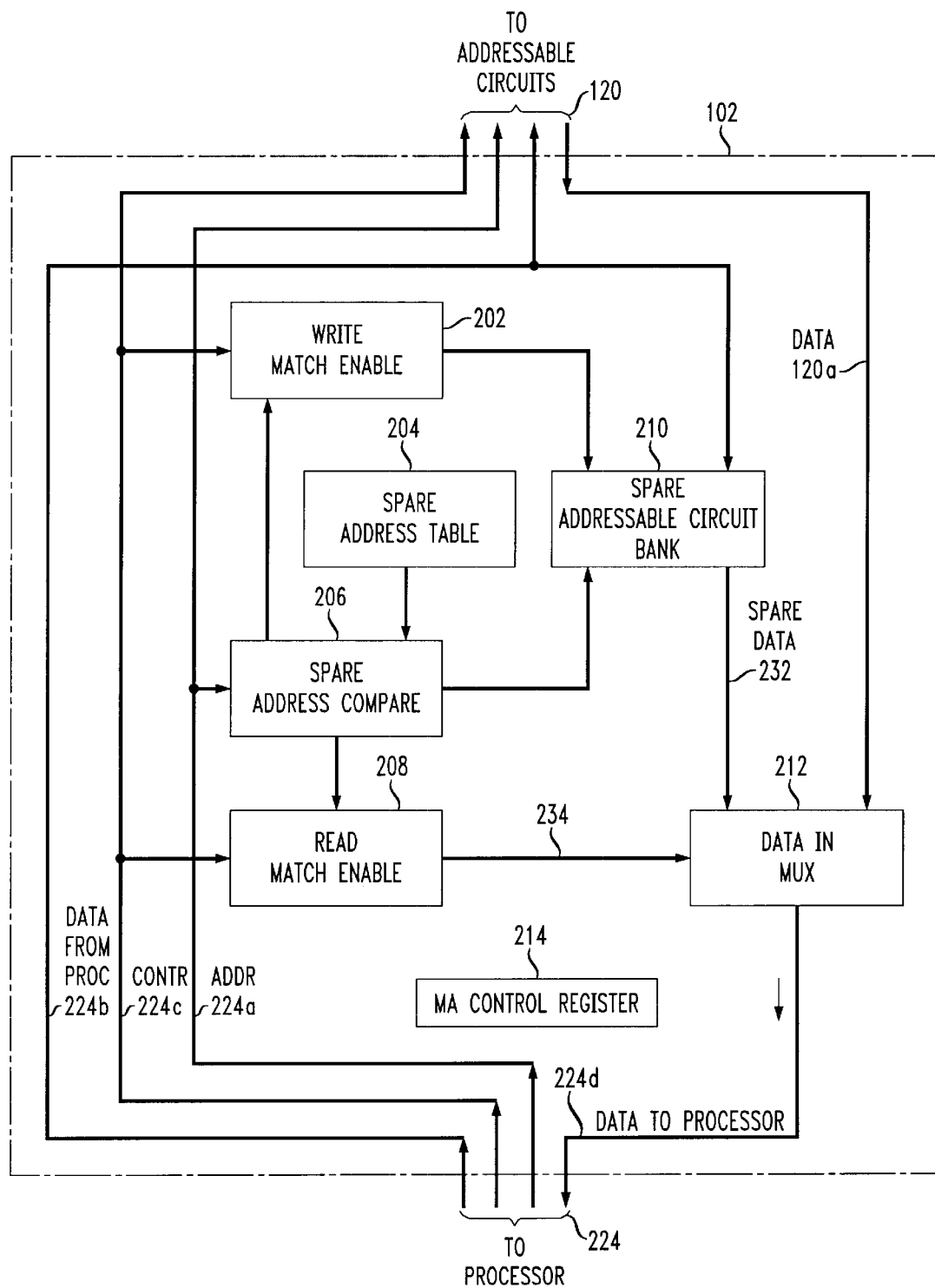
FIG. 2 is a block diagram of an exemplary embodiment of the memory overlay module shown in FIG. 1.

FIG. 2 is a block diagram of an exemplary embodiment of the memory aliasing or overlay module 102 shown in FIG. 1.

In particular, the memory aliasing module 102 in FIG. 2 includes a spare address table 204 and spare addressable circuitry, e.g., spare addressable circuit bank 210. In the disclosed embodiment, there is a one-to-one correspondence between each spare word in the spare addressable circuits 210 and a corresponding assignable address in the spare address table 204. Thus, both the spare address table 204 and the spare memory 210 have an equal length.

The spare address table 204 may be a set of registers with each register bit output tied to the input of a comparison circuit, e.g., an XNOR gate or other combinatorial logic which is used to compare the spare addresses to the current address on the address bus 224a.

The spare addressable circuit bank 210, e.g., spare memory, may be a set of registers which have tri-state drivers tied to their outputs. As appropriate, each word in the spare addressable circuit bank 210 is assignable by an appropriate write to an available corresponding address in the spare address table 204 by the processor 104 to replace a overlaid word in the memory blocks 110.

The spare addressable circuits in the spare addressable circuit bank 210 may be enabled in any conventional manner. For instance, in the disclosed embodiment, the spare memory words in the memory aliasing module 102 are enabled by a logic high or '1' written to the 16th or most significant bit (MSB) of the address of the spare word. After the spare address has been written into the appropriate register in the spare address table 204 and the overlay enable bit has been set in the memory aliasing control register 214, each read and write to the applicable addressable circuit, e.g., word in memory blocks 110, causes the address bus 224a to be "snooped" for a match with the entries in the spare address table 204. The spare addressable circuits in the memory aliasing module 102 may be disabled as a default condition by, e.g., clearing associated register values in the memory aliasing control register 214.

In the disclosed embodiment, the spare address and memory values stored in the memory aliasing module 102 remain undisturbed so long as the computer system 100 remains powered. Thus, a soft reset, i.e., powered reset of the computer system 100 does not influence the spare address and memory values. Non-volatile memory can be used in the memory aliasing module 102 to retain the addresses of overlaid words in the spare address table 204 during power-down conditions. Alternatively, the overlaid word address data can be stored in non-volatile RAM of an external host processor after the initial power-up and initialization sequence of the computer system 100. In this case, subsequent hard resets may be followed up by a few writes to the spare address table 204 to restore the previous aliasing information (e.g., the overlaid word address) in the memory aliasing module 102. The overlaid word address may alternatively be stored in volatile memory, in which case the overlaid word addresses should be loaded after each power up.

In any event, while providing similar fast access, the storage of spare addresses and overlaid memory values in the memory aliasing module 102 is different from storage in a conventional cache memory, for example, in that the storage in the memory aliasing module 102 according to the principles of the present invention is persistent, and is not replaced by block or page replacement strategy as is the case with contents of a cache memory.

The memory aliasing module 102 invisibly intercepts a data path between the addressable circuits, e.g., memory blocks 110 (and/or one or more cache memories if utilized in the computer system 100) and the processor 104 by performing snooping of the memory interface 120.

A logic high or '1' in the MSB of the address enables the respective spare addressable circuit, e.g., memory word for the assigned address. The memory aliasing control register 214 is accessed by the processor 104 and/or by a processor external to the computer system 100. The spare address table 204 and/or the memory aliasing control register 214 may reside in processor and/or input/output (I/O) space.

The memory aliasing module 102 shown in FIG. 2 further includes an address comparison module 206 to snoop the address bus 224a and compare all addresses with those stored in the spare address table 204. If the current address on the address bus 224a matches an assigned entry in the spare address table 204, then either a write match enable 202 or read match enable 208 is activated, depending upon whether the address on the address bus 224a corresponds to a write or read command as determined by read rd and/or write wr control signals on the control bus 224c. The write match enable 202 and read match enable 208 are qualified by the read rd and/or write wr control signals on the control bus 224c (which may be combined into a single signal in some systems), and the enable bit in the memory aliasing control register 214 for the spare, i.e., overlaying memory, in the spare addressable circuit bank 210.

If the matched address is for a write operation from the processor 104, the data word on the data bus 224b is written to the appropriate location in the spare addressable circuit bank 210. If the matched address is for a read operation, the appropriate word in the spare addressable circuit bank 210 is output from the spare addressable circuit bank 210 on spare data bus 232 to a first input of a data multiplexer (MUX) 212. Substantially simultaneously or before, the read match enable 208 switches the output of the data MUX 212 from its otherwise normal position of allowing the data bus 120a to output data to data bus 224d, to a new position passing the data 232 from the spare addressable circuit bank 210 onto the data bus 224d.

In the disclosed embodiment, each spare address bit in the spare address table 204 is compared by a bitwise comparison, e.g., an exclusive NOR (XNOR) with the corresponding address bit on the address bus 224a. All of the compare bits in a given spare address word are compared and ANDed with an enable bit in the spare address table 204 (along with the spare enable bit from the memory aliasing control register 214 and the memory read control signal rd on the control bus 224c from the processor 104) to form a data multiplex select signal 234 which determines the source of data to the processor 104, i.e., either from the spare addressable circuit bank 210 (associated with the selected spare address in the spare address table 204) or from the standard addressable circuits, e.g., memory blocks 110. In the case of writes, the data on data bus 224b will be sent to both the memory blocks 110 and to the spare addressable circuit bank 210. If the spare address compare 206 results in a match with an assigned address in the spare address table 204 and the appropriate enable bit is set in the memory aliasing control register 214, then the written data on data bus 224b will be stored appropriately in the spare addressable circuit 210 (and also by the appropriate address in the memory blocks 110).

The enable signal 234 from the read match enable 208 to the data MUX 212 preferably arrives in advance of the data on the data bus 120a and/or spare data bus 232, so that the propagation delay of the data MUX 212 is the only speed penalty in this embodiment of the present invention. An alternate scheme possibly having a lower speed penalty intercepts and jams appropriate chip enable signals cs in the control bus 224c to the overlaid addressable circuits, e.g., in memory blocks 110, and simply allows the spare addressable circuit bank 210 to drive the data bus 224d directly (instead of through the data MUX 212 as shown in FIG. 2) for the duration of the access to the defective memory word. Thus, the data MUX 212 and its associated propagation delay may be reduced if desired.

The initial write of the overlaid memory words into the spare addressable circuit 210 may be accomplished using a broadcast write feature as explained in more detail in the above identified co-pending sister application. In a broadcast write, all or a substantial portion of the overlaid memory in memory blocks 110 is written to the spare addressable circuits 210 substantially simultaneously by forcing all of the block based select signals cs on the control bus 224c to an active or enabled state.

Figure 3:
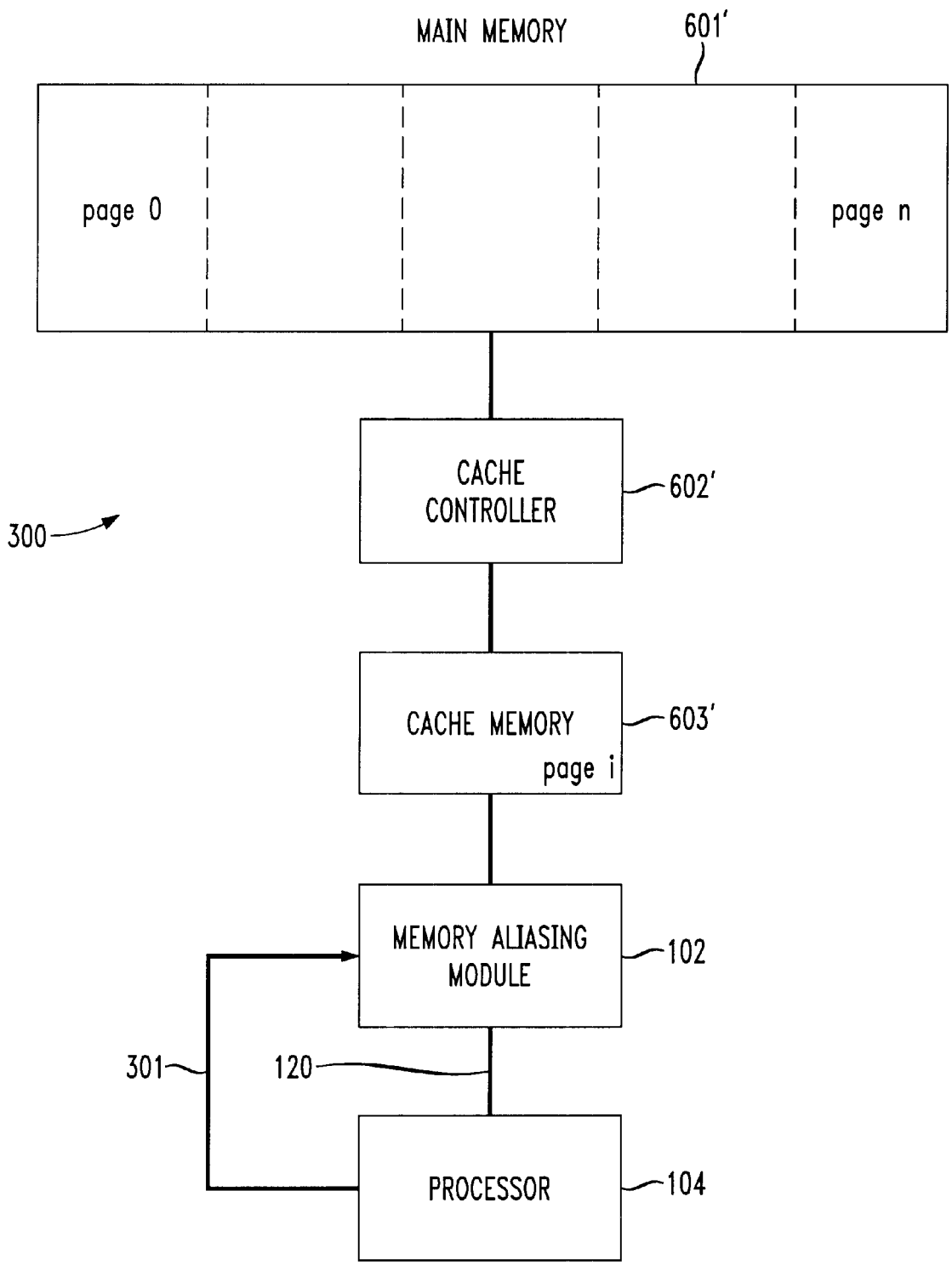
FIG. 3 is a block diagram of an exemplary embodiment of the memory aliasing overlay module shown in FIG. 1 with respect to context switching, in accordance with the principles of the present invention.

FIG. 3 depicts an example of the operation of the memory aliasing module 102 with respect to context switching, e.g., during a servicing of an interrupt, according to the principles of the present invention.

In contrast to the conventional computer system 600 of FIG. 6, the computer system 300 shown in FIG. 3 includes a memory aliasing (or overlay) module 102.

The computer system 300 may have a number of internal or external interrupt sources, e.g., various I/O devices requesting service, and may have an interrupt service routine for handling each of the interrupt sources. For example, the computer system 300 may have eight (8) different interrupt sources, e.g., the keyboard, the disk drive, etc., and have eight (8) different interrupt service routines (ISR), one ISR for handling each interrupt by one the eight (8) different sources.

When an interrupt is invoked by one of the sources, a unique interrupt vector number corresponding to the invoked interrupt is generated, and is passed to the processor 104. The processor 104 generates an interrupt vector address based on the received vector number, and calls the corresponding interrupt service routine.

The interrupt service routines are typically stored within the system main memory, e.g., within memory blocks 110.

According to the principles of the present invention, the interrupt service routines are pre-loaded into portions of spare addressable circuit bank 210 of the memory aliasing module 102 at power-up or hard reset of the computer system 300. Contemporaneously with the interrupt service routines, the corresponding interrupt vector addresses are also pre-loaded in the corresponding locations of the spare address table 204 of the memory aliasing module 102. The pre-loading may be made a part of the boot up sequence, e.g., a part of the BIOS or boot up batch files, and may or may not allow the user to choose whether or not the pre-loading should proceed. Alternatively, the interrupt service routines and the corresponding interrupt vector addresses may be loaded while the computer system 300 is in operation via the host interface of the implement module 106.

In a preferred embodiment of the present invention, the memory aliasing module 102 may be disabled during a normal operation of the computer system 300. A normal operation of the computer system 300 may be substantially same as that of the conventional computer system 600 previously described.

According to the principles of the present invention, the memory aliasing module 102 may be disabled by, e.g., providing and resetting of a master enable, i.e., a chip enable, for the memory aliasing module 102. Alternatively, the memory aliasing module 102 may be disable by clearing the memory aliasing control register 214, i.e., setting each bit to a zero (0).

The memory aliasing module 102 may be enabled by a triggering signal 301, which may be, for example, an interrupt acknowledgement signal which the processor 104 outputs in response to an interrupt request from one of the interrupt sources.

Thus, prior to an occurrence of an interrupt, the computer system 300 interacts with, e.g., reads and writes to and from, the cache memory 603' (and the main memory 601' through the cache controller 602') in the same manner as the conventional computer system 600 as previously described.

When an interrupt occurs, e.g., when an I/O device requests service by raising an interrupt line (and typically a programmable interrupt controller (PIC), not shown, generates an interrupt vector), the processor 104 responds by issuing a control signal called the interrupt acknowledgement.

In a conventional computer system, e.g., the computer system 600, the operating system (OS) must handle the interrupt by storing the current values of the registers and the program counter of the processor 104, and direct the processor 104 to call an appropriate interrupt service routine. Because the interrupt service routine is not likely to be stored in the cache memory 603, it must be brought to the cache memory 603 from somewhere else, e.g., the BIOS ROM or the main memory 601. In other words, a cache miss is likely to occur when the processor 104 of the conventional computer system 600 tries to call an interrupt service routine.

Moreover, because the service routine is likely to have displaced an existing page (which probably had a high likelihood of being referenced soon) from the cache memory 603, yet another cache miss is likely to occur when the handling of the interrupt is completed, and the processor 104 resumes operation back at the point in the code prior to the occurrence of the interrupt.

In contrast, according to the principles of the present invention, the memory aliasing module 102 of the computer system 300 is enabled, e.g., by enabling the master enable, or setting the appropriate bits in the memory aliasing control register 214. Once enabled, the memory aliasing module 102 snoops the address bus 224a as previously described, and effectively overlays the cache memory 603' (or the main memory 601') by redirecting access to the same by the processor 104 to the appropriate spare addressable circuits in the spare addressable circuit bank 210, which corresponds to the address in the spare address table 204 matching the interrupt vector address on the address bus 224a. The processor 104 executes an appropriate interrupt service routine from the appropriate portions of the spare addressable circuit bank 210.

At completion of the interrupt service routine, an I/0 write may be made to disable the memory aliasing module 102, e.g., by disabling the master enable or by clearing the memory aliasing control register 214.

As can be appreciated, no memory access to the cache memory 603' or the main memory 601', and more importantly, no cache miss has occurred in the computer system 300 while servicing the interrupt.

Moreover, at the completion of the interrupt service routine, the memory aliasing module 102 is disabled, and thus, the processor 104 resumes prior operations while the cache memory holds the same page, e.g., page i, still in the cache memory 603'.

Thus, it can be appreciated that the memory aliasing method and apparatus, according to the principles of the present invention, provides an efficient context switching which avoids at least one cache miss that would have occurred in a conventional computer system.

Figure 4:
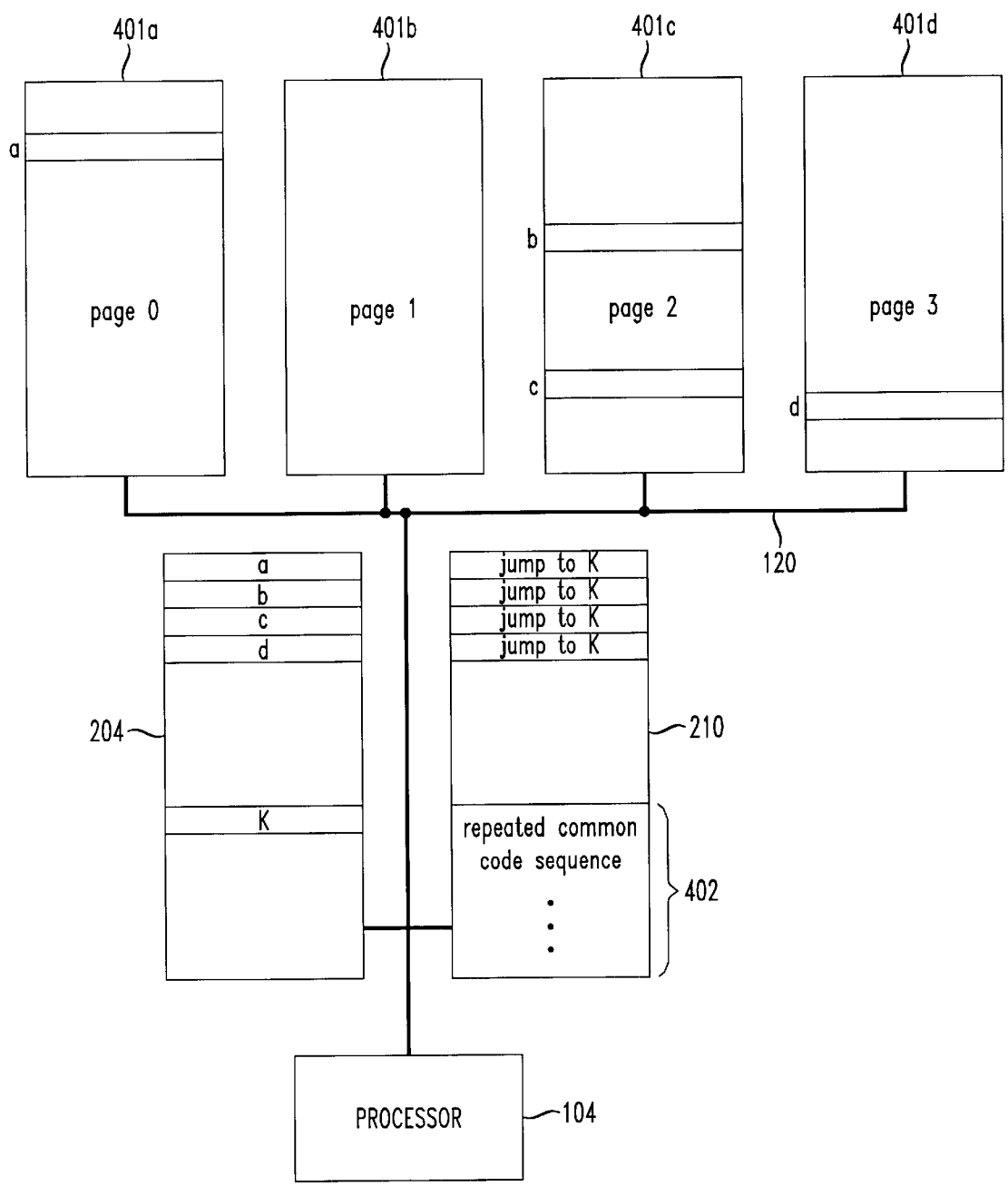
FIG. 4 is a block diagram of an exemplary embodiment of the memory aliasing overlay module shown in FIG. 1 with respect to code size reduction by overlaying common code segments, in accordance with the principles of the present invention.

FIG. 4 shows an exemplary embodiment of the memory overlay module with respect to code size reduction by overlaying common code segments, in accordance with the principles of the present invention.

In particular, a repeated common code segment 402 is stored in the spare addressable circuit bank 210 of the memory aliasing module 102. According to the principles of the present invention, the common code segment 402 is pre-loaded into a portion of spare addressable circuit bank 210 of the memory aliasing module 102 at power-up or hard reset of the computer system 300. The pre-loading may be made a part of the boot up sequence, e.g., a part of the BIOS or boot up batch files, and may or may not allow the user to choose whether or not the pre-loading should proceed. Alternatively, the common code segment 402 may be loaded while the computer system 300 is in operation via the host interface of the implement module 106.

A set of instruction codes (or program) may be reduced in size by replacing the common code segment 402 that may take up many memory locations with a single reference, e.g., call or the name of the common code segment 402, taking up only one memory location, e.g., a, b, c or d. In this embodiment, the actual contents of the addresses a, b, c, and d are not important. What is important is that the addresses a, b, c, and d are locations within a set of instruction codes at which the common code segment 402 would have been if the reduction in size was not performed.

The addresses of the main memory 401a–401d, e.g., a, b, c and/or d, which reference (or call) the common code segment 402 are also pre-loaded in the corresponding locations of the spare address table 204 of the memory aliasing module 102. The pre-loading of the addresses, e.g., a, b, c, and/or d, may be contemporaneous with the loading of the common code segment 402, and/or it may be subsequent to the loading of the common code segment 402, e.g., when a new set of codes that reference or contain the common code segment 402 is compiled. The compiler may be made to automatically compress a new set of codes that contain the common code segment 402 by replacing it with a reference, and loading the address of the reference in the spare address table 204.

Whenever an address, e.g., a, b, c and/or d, which serves as a reference to the common code segment 402 is loaded in the spare address table 204, a jump to k instruction is stored in the corresponding location within the spare addressable circuit bank 210. The address k is the starting address of the common code segment 402 within the spare addressable circuit bank 210.

The memory aliasing module 102 snoops the address bus 224a of the memory interface 120 as previously described. When the processor 104 tries to access (from the cache or the main memory) the memory location whose address is contained in the spare address table 204, e.g., a, b, c or d, the memory aliasing module 102 detects the access attempt. Upon detection, the memory aliasing module 102 redirects the processor 104 to access the corresponding location within the spare addressable circuit bank 210, as previously described. The processor 104 then executes the common code segment 402 from the spare addressable circuit bank 210 due to the jump to k instruction.

It can be appreciated that a significant amount of instruction code compression (and thus increased speed) can be achieved by externally referencing a common code segment 402, while still providing the processor 104 a fast access to the common code segment 402 by overlaying memory locations, e.g., a, b, c, and d, and by providing vectored jumps to the common code segment 402 in the spare addressable circuit bank 210.

Figure 5:
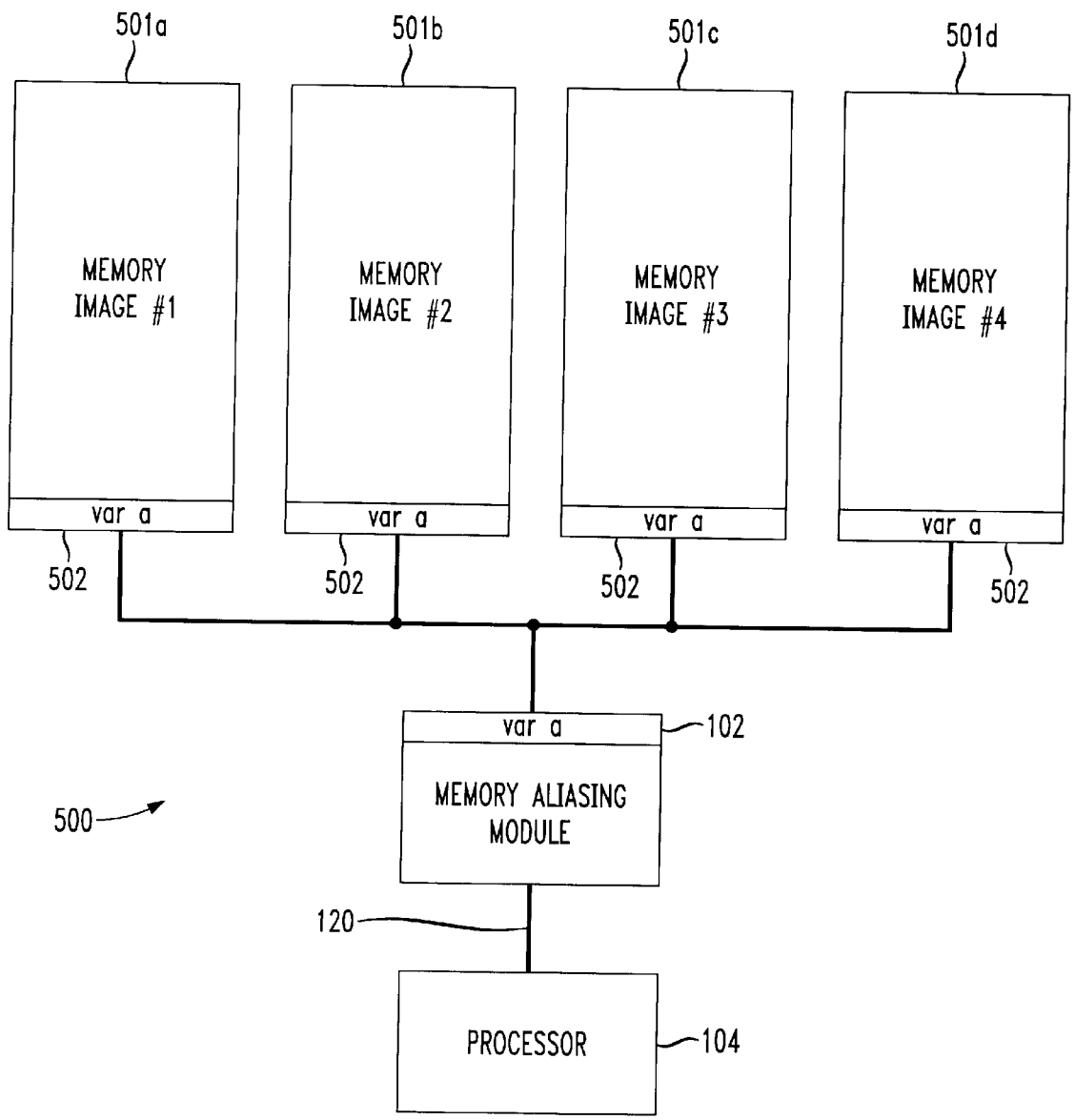
FIG. 5 is a block diagram of an exemplary embodiment of the memory aliasing overlay module shown in FIG. 1 with respect to storage of common global variables in a multi-tasking environment, in accordance with the principles of the present invention.

FIG. 5 shows an embodiment of the memory overlay module with respect to storage of common global variables, in accordance with the principles of the present invention.

In particular, memory images 501a–501d depict application spaces of a memory, e.g., a main memory, in a multi-tasking environment. Each image 501a, 501b, 501c, or 501d, represents an application program being run by the processor 104. Each application program may be a different application from the other application program, or may be a copy of at least one other running application program.

For example, the application program in memory image #1 501a may be an exact copy of the application program in memory image #2 501b where each copy of the application program may be servicing a different channel, client or user. Each program loaded in each of the memory images 501a–501d may also be, as another example, a thread of the same application program. Alternatively, var a 502 may be a system level variable that is common to all applications running in the system 500. In any event, each of the applications in memory images 501a–501d may include the same variable var a 502.

When an application program is loaded into the memory, the memory is typically divided or partitioned into several areas, e.g., a system area which the operating system uses (e.g., the stack, heap, etc.) and one or more application areas where the application program(s) is (are) loaded. Typically, when an application program is compiled, the compiler arranges global variables of the application program to be stored within a particular section of the application area, referred as the "global variable space", when the application is loaded into a memory to be executed. Each global variable in the global variable space is then referenced by a global variable pointer address, which is typically some offset from, for example, a starting address of the application area.

In a conventional processor/memory architecture, each memory image would have its own global variable space, each storing global variables, even when, for example, multiple copies of an application are being run. The stored global variables may be common to all copies of the application, and thus are redundantly stored. This conventional multi-tasking scheme is wasteful of memory space. In contrast, the system 500 according to one embodiment of the principles of the present invention overlays common global variable space, thus freeing memory (and/or cache) space which otherwise would have been taken up by storage of the global variables. The freed up memory space can be used to store other parts of the application program, and thus effectively reduces the overall size of the application program.

A compiler usable with the inventive system 500 arranges to create global variable space in the memory aliasing module 102 rather than in an application area of the memory by storing variables in available spare addressable circuits of the spare addressable circuit bank 210, and/or by storing corresponding global variable pointer addresses in the spare address table 204 of the memory aliasing module 102.

When during an execution of an application program the processor 104 tries to access a global variable, e.g., var a, by placing one of the global variable pointer address on address bus 224a and either a read or a write signal on control 224c, the memory aliasing module 102 intercepts the access attempt. In response, the memory aliasing module 102 supplies var a from a location in the spare addressable circuit bank 210 corresponding to the matched global variable pointer address in the spare address table 204.

If the variable var a is a common global variable, e.g., when multiple copies of the same applications are being run, the savings in memory space, the increased speed due to reduction in size, etc., may be multiplied by the number of applications being run simultaneously. Moreover, the possible avoidance of cache misses and/or of thrashing may be improved greatly.

It can thus be appreciated that a significant memory savings and/or speed increase may be realized by overlaying common global variables and/or global variable spaces, in accordance with the principles of the present invention.

While the memory aliasing apparatus and method according to the principles of the present invention have been described particularly with reference to a preferred embodiment using an exemplary module, the present invention may be implemented with any such module capable of monitoring memory access by a processor, and capable of overlaying system and/or user definable information in a faster memory.

While the invention has been described with reference to the exemplary embodiments thereof, those skilled in the art will be able to make various modifications to the described embodiments of the invention without departing from the true spirit and scope of the invention.

What is claimed is:

1. A memory aliasing apparatus, comprising:
   at least one spare addressable circuit having repeatedly referenced information persistently stored therein;
   an overlay control module intercepting a data path between a processor and a plurality of addressable circuits, said overlay control module being adapted to redirect to said at least one spare addressable circuit access to said repeatedly referenced information from said at least one of said plurality of addressable circuits by said processor; and
   enable means for enabling and disabling said memory aliasing apparatus from redirecting said access by said processor, and for enabling said memory aliasing apparatus based on an interrupt acknowledgement signal.

2. The memory aliasing apparatus according to claim 1, wherein said overlay control module comprises:
   a spare address table adapted to contain at least one address assigned to said at least one spare addressable circuit; and
   an address compare circuit adapted to compare an address of an access from said processor with said at least one address assigned to said at least one spare addressable circuit.

3. The memory aliasing apparatus according to claim 1, wherein:
   said repeatedly referenced information is user definable data.

4. The memory aliasing apparatus according to claim 1, wherein said repeatedly referenced information comprises:
   at least one common global variable.

5. The memory aliasing apparatus according to claim 1, wherein said repeatedly referenced information comprises:
   at least one common code segment.

6. The memory aliasing apparatus according to claim 1, wherein said repeatedly referenced information comprises:
   at least one interrupt service routine.

7. The memory aliasing apparatus according to claim 6, wherein:
   said enable means enables said memory aliasing apparatus upon issuance of said interrupt acknowledgement signal by said processor.

8. The memory aliasing apparatus according to claim 6, wherein:
   said enable means enables said memory aliasing apparatus unless said interrupt acknowledgement signal is issued by said processor.

9. The memory aliasing apparatus according to claim 1, wherein:
   said enable means is further for disabling said memory aliasing apparatus upon a communication from said processor.

10. The memory aliasing apparatus according to claim 9, wherein:
    said communication from said processor is an I/O write directed to said memory aliasing apparatus.

11. The memory aliasing apparatus according to claim 4, wherein:
    a value of said at least one common global variable is stored external to said plurality of addressable circuits.

12. The memory aliasing apparatus according to claim 5, wherein:
    said at least one common code segment is stored external to said plurality of addressable circuits.

13. A method of providing overlay of at least one location in a plurality of addressable circuits for access by a processor, comprising:
    providing at least one spare addressable circuit;
    persistently storing in said at least one spare addressable circuit repeatedly referenced information;
    intercepting a data path between said processor and said plurality of addressable circuits;
    redirecting access to said repeatedly referenced information from said at least one location of said plurality of addressable circuits by said processor to said at least one spare addressable circuit; and
    enabling said step of redirecting access based on an interrupt acknowledgement signal.

14. The method of providing overlay of at least one location in a plurality of addressable circuits for access by a processor according to claim 13, further comprising:
    storing at least one address assigned to said at least one spare addressable circuit in a spare address table; and
    comparing an address of an access from said processor with said assigned address of said at least one spare addressable circuit.

15. The method of providing overlay of at least one location in a plurality of addressable circuits for access by a processor according to claim 13, further comprising:
    appropriately enabling and disabling said step of redirecting said access to said repeatedly referenced information.

16. The method of providing overlay of at least one location in a plurality of addressable circuits for access by a processor according to claim 15, further comprising:

disabling said step of redirecting said access to said repeatedly referenced information upon a communication from said processor.

17. The method of providing overlay of at least one location in a plurality of addressable circuits for access by a processor according to claim 15, further comprising:

disabling said step of redirecting said access to said repeatedly referenced information upon an I/O write communicated from said processor.

18. The method of providing overlay of at least one location in a plurality of addressable circuits for access by a processor according to claim 15, wherein said step of persistently storing comprises:

storing at least one interrupt service routine.

19. The method of providing overlay of at least one location in a plurality of addressable circuits for access by a processor according to claim 18, wherein:

said step of redirecting access to said repeatedly referenced information is enabled upon issuance of an interrupt acknowledgement signal by said processor.

20. The method of providing overlay of at least one location in a plurality of addressable circuits for access by a processor according to claim 18, wherein:

said step of redirecting access to said repeatedly referenced information is disabled unless an interrupt acknowledgement signal is issued by said processor.

21. A. The method of providing overlay of at least one location in a plurality of addressable circuits for access by a processor according to claim 13, wherein said step of persistently storing comprises:

storing at least one common code segment.

22. The method of providing overlay of at least one location in a plurality of addressable circuits for access by a processor according to claim 20, further comprising:

increasing availability of said plurality of addressable circuits by removing said at least one common code segment from said plurality of addressable circuits.

23. The method of providing overlay of at least one location in a plurality of addressable circuits for access by a processor according to claim 13, wherein said step of persistently storing comprises:

storing at least one common global variable.

24. The method of providing overlay of at least one location in a plurality of addressable circuits for access by a processor according to claim 22, further comprising:

increasing availability of said plurality of addressable circuits by removing said at least one common global variable from said plurality of addressable circuits.

* * * * *